(12) United States Patent
Reeves (10) Patent No.: US 9,794,296 B1
(45) Date of Patent: \*Oct. 17, 2017

(54) PRESERVING PRIVACY RELATED TO NETWORKED MEDIA CONSUMPTION ACTIVITIES

(71) Applicant: Quantcast Corporation, San Francisco, CA (US)

(72) Inventor: Damian John Reeves, Menlo Park, CA (US)

(73) Assignee: Quantcast Corporation, San Francisco, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/274,090

(22) Filed: Sep. 23, 2016

Related U.S. Application Data

(63) Continuation of application No. 14/743,966, filed on Jun. 18, 2015, now Pat. No. 9,477,840, which is a continuation of application No. 14/306,832, filed on Jun. 17, 2014, now Pat. No. 9,137,266, which is a continuation of application No. 14/022,525, filed on Sep. 10, 2013, now Pat. No. 8,839,355, which is a continuation of application No. 13/433,121, filed on Mar. 28, 2012, now Pat. No. 8,561,133, which is a (Continued)

(51) Int. Cl.
*H04L 29/06* (2006.01)
*H04L 29/08* (2006.01)

(52) U.S. Cl.
CPC ...... *H04L 63/20* (2013.01); *G06F 2221/2111* (2013.01); *H04L 67/10* (2013.01); *H04L 67/18* (2013.01); *H04L 67/20* (2013.01)

(58) Field of Classification Search
CPC ..................................................... G06F 21/60
See application file for complete search history.

(56) References Cited

U.S. PATENT DOCUMENTS 6,501,421 B1 \* 12/2002 Dutta .................. G06F 17/3087
342/357.22
7,360,251 B2 \* 4/2008 Spalink ............... G06F 21/6254
705/74

(Continued)

*Primary Examiner* — Hadi Armouche
*Assistant Examiner* — Hee Song
(74) *Attorney, Agent, or Firm* — Robin W. Reasoner; Renee D. Jacowitz (57) ABSTRACT

Preserving privacy related to networked media consumption activity. Source privacy zones are defined and associated with privacy standards. Privacy standards include frequency criteria governing the storage of datasets including information associated with networked media consumption activity collected from the source privacy zone. Transaction requests including a networking protocol address are received over a network from a client device at a target location by a networked privacy system. The source privacy zone associated with the client device is identified. Using the networking protocol address to access characteristics having characteristic value(s), a dataset can be created including associating the networked media consumption activity with the characteristic and characteristic value(s). The dataset is pre-processed to comply with the privacy standards. The networking protocol address is discarded. The pre-processed dataset can be stored in a filtered database on a physical storage device at a storage location coupled to the networked privacy system.

15 Claims, 3 Drawing Sheets

Related U.S. Application Data continuation of application No. 12/340,259, filed on Dec. 19, 2008, now Pat. No. 8,185,931.

(56) References Cited

U.S. PATENT DOCUMENTS

| | | | | |
|---|---|---|---|---|
| 2002/0021665 | A1* | 2/2002 | Bhagavath | H04L 12/2602 370/229 |
| 2005/0027981 | A1* | 2/2005 | Baum-Waidner | H04L 63/1408 713/164 |
| 2005/0251573 | A1* | 11/2005 | Merkow | G06F 21/602 709/226 |
| 2006/0230058 | A1* | 10/2006 | Morris | G06Q 10/063 |
| 2008/0235623 | A1* | 9/2008 | Li | G06F 17/30867 715/817 |
| 2009/0282012 | A1* | 11/2009 | Konig | G06F 17/278 |
| 2010/0064368 | A1* | 3/2010 | Stolfo | G06F 21/564 726/24 |
| 2010/0077484 | A1* | 3/2010 | Paretti | G06F 21/6245 726/26 |

* cited by examiner

PRESERVING PRIVACY RELATED TO NETWORKED MEDIA CONSUMPTION ACTIVITIES

CROSS-REFERENCE TO RELATED APPLICATIONS

This application is a Continuation application of U.S. Non-Provisional application Ser. No. 14/743,966 filed on Jun. 18, 2015 by Damian John Reeves, entitled "Preserving Privacy Related to Networked Media Consumption Activities", which is a Continuation application of U.S. Non-Provisional application Ser. No. 14/306,832 filed on Jun. 17, 2014 by Damian John Reeves, entitled "Preserving Privacy Related to Networked Media Consumption Activities", now U.S. Pat. No. 9,137,266, which is a Continuation application of U.S. Non-Provisional application Ser. No. 14/022,525 filed on Sep. 10, 2013 by Damian John Reeves, entitled "Method and System for Preserving Privacy Related to Networked Media Consumption Activities", now U.S. Pat. No. 8,839,355 which is a Continuation application of U.S. Non-Provisional application Ser. No. 13/433,121 filed on Mar. 28, 2012 by Damian John Reeves, entitled "Method and System for Preserving Privacy Related to Networked Media Consumption Activities", now U.S. Pat. No. 8,561,133 which is a Continuation application of U.S. Non-Provisional application Ser. No. 12/340,259 filed on Dec. 19, 2008, by Damian John Reeves, entitled "Method and System for Preserving Privacy Related to Networked Media Consumption Activities," now U.S. Pat. No. 8,185,931, issued on May 22, 2012, which are all herein incorporated by reference.

FIELD OF INVENTION

The invention relates to methods and systems for preserving the privacy of networking protocol addresses collected by networked systems.

BACKGROUND OF INVENTION

Data such as networking protocol addresses and data related to visitor interaction with networked systems such as internet media outlets and web sites can be collected using a variety of techniques. For example, when an end-user operates a web browser on an internet enabled client device such as a personal computer and attempts to view a website, the Internet Protocol (IP) address of the client device can be provided to the web site. In some cases, this IP address may be recorded by the web site or a third party system and coupled to additional data regarding the client device and/or interaction such as the time of day, the type of browser used, geographic location and an activity history with respect to the web site.

The collection of networking protocol addresses such as IP addresses, coupled with other data such as data related to media consumption activities has raised privacy concerns among regulatory groups associated with various governments. For example, networked media outlets serving international communities may be forced to comply with privacy regulations which can vary from region to region.

What is needed is a system and method for preserving privacy related to networked media consumption activities while retaining the ability to collect and analyze data associated with the interactions between client devices and networked systems.

SUMMARY OF INVENTION

The current invention is a method and system for preserving privacy related to networked media consumption activity. According to the current invention, one or more source privacy zones are defined and associated with privacy standards. Privacy standards include one or more frequency criteria governing the storage of datasets including information associated with networked media consumption activity collected from the source privacy zone. Transaction requests including a networking protocol address can be received over a network from a client device at a target location by a networked privacy system. The source privacy zone associated with the client device can be identified. Using the networking protocol address to access at least one characteristic having at least one characteristic value, a dataset can be created including associating the networked media consumption activity with the characteristic(s) and characteristic value(s). The dataset is pre-processed to comply with the privacy standards. The networking protocol address is discarded. The pre-processed dataset can be stored in a filtered database on a physical storage device at a storage location coupled to the networked privacy system.

DETAILED DESCRIPTION OF THE INVENTION

Figure 1:
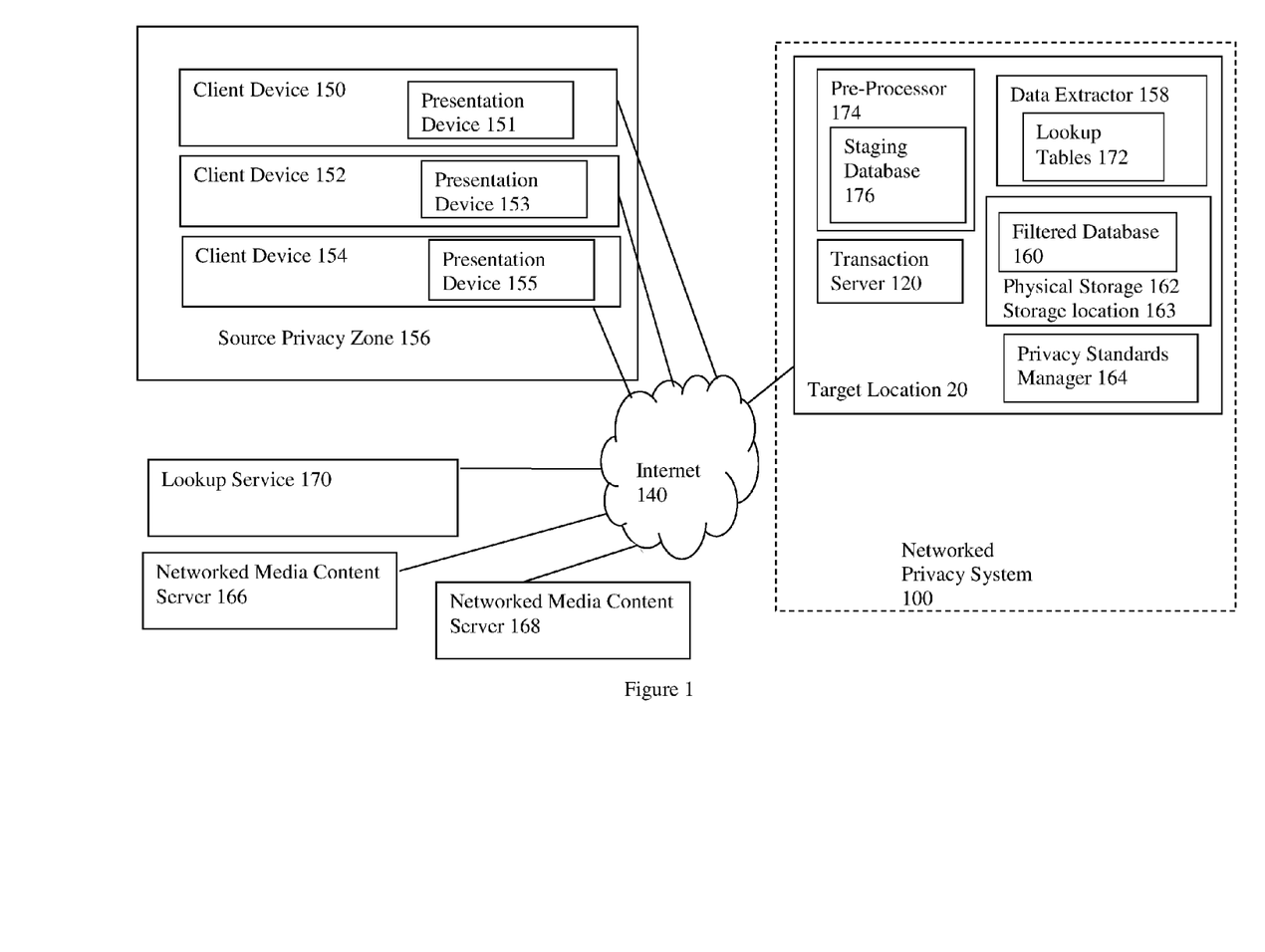
FIG. 1 illustrates a networked privacy system for preserving privacy related to networked media consumption activities according to the current invention.

FIG. 1 illustrates a networked privacy system 100 for preserving privacy related to networked media consumption activities according to the current invention. A networked privacy system 100 includes a transaction server 120 coupled to a network 140, a data extractor 158, a privacy standards manager 164, a pre-processor 174 and a filtered database 160 stored on a physical storage device 162.

According to the current invention, privacy zones with associated privacy standards can be established. A privacy zone can be a geographic region where privacy standards can be established to regulate the storage of data into a filtered database such as filtered database 160 based on one or more frequency criteria. By preventing the storage of sensitive and/or re-identifiable data in the filtered database, the current invention supports preserving privacy related to networked media consumption activities. For example, in some cases, the privacy standards can correspond to governmental policies or laws related to privacy and/or security of personally identifiable information (PII) and the privacy zone can correspond to the contiguous or non-contiguous physical territory governed by the governmental policies and/or laws.

Privacy standards are associated with a source privacy zone and can include one or more frequency criteria to govern the storage of datasets including information associated with networked media consumption activity collected within the associated source privacy zone. One example of a privacy standard including a frequency criterion is: "Permit the storage of the client domain name associated with networked media consumption activity for a particular client domain in the filtered database as long as there are at least 500 media consumption activities originating from that client domain in a time window equal to one day." The privacy standard includes: at least one characteristic (in this case the client domain name) and at least one frequency criterion (in this case 500 media consumption activities per day). In this example, the frequency criterion is to be evaluated to with respect to each separate client domain characteristic value (such as bigcompany.com, littlecompany.com, school.edu. etc.) for a time window (per day). In some cases, examples of the current invention can support more complex privacy standards such as privacy standards including more than one characteristic, frequency criteria including sets of characteristic values or characteristic value ranges, complex frequency criteria based on models and/or frequency criteria which vary over time. In some examples, the time window can be a fixed time window or a moving time window.

It is envisioned that in some embodiments of the current invention, nested source privacy zones could be supported. For example, a nested source privacy zone system could be used to enforce the different privacy regulations that might be apply based on local, regional and country-wide legislation or policies.

There is great interest in statistical data related to networked media consumption activities. Privacy standards can be implemented in conjunction with the current invention to prevent re-identification and ensure the privacy of end users within a geographic zone while preserving access to statistically valid data. For example, privacy standards can be used to prevent the storage of datasets because they are too small and/or data ranges are too specific to preserve the privacy of the end user. In some cases, the data extractor and/or the pre-processor can be configured to automatically support compliance with privacy standards by deleting some data fields, replacing data in datasets with a broader data range and/or statistically obfuscating data in datasets before permitting storage in the filtered database, thereby preserving the statistical integrity of the data and the privacy of the end-user.

A Privacy Standards Manager 164 accesses the privacy standards and the definitions of the source privacy zones. In some cases, the privacy standards and/or the source privacy zone definitions can be centrally located or distributed across multiple systems and/or locations, but still accessible by the Privacy Standards Manager.

Networked media outlets such as networked media outlets 166 and 168 can provide media content such as media content over a network 140 such as the Internet, an intranet, a cellular phone network, a cable television network or combinations thereof. Examples of media content can include web pages, audio content, video content, networked gaming content, video on demand, internet protocol TV (IPTV) or combinations thereof. The media content can be presented to end users through client devices 150, 152 and 154 such as, but not limited to, personal computers, laptops, personal digital assistants (PDAs), cell phones and/or televisions receiving cable content using presentation devices 151, 153 and 155 such as monitors, screens, televisions and/or audio speakers.

For example, a client device 150 located in a source privacy zone 156 such as the European Union (E.U.) can access networked media content from a networked content server 166 such as a website. By embedding commands in the website, the networked content server 166 can direct the client device 150 to submit a transaction request such as an image request which includes a request for a beacon from a third party system such as the networked privacy system 100 according to the current invention. Beacons are also known as tracking pixels or clear GIFs (Graphics Interchange Format). The transaction request can include a networking protocol address such as, but not limited to, an IP address or a MAC address. In some cases, the transaction request can include additional information such as, but not limited to, cookies. In some cases, additional information which can provide and/or cross-reference data such as, but not limited to, data related to the networked media content, recent and/or historical interactions with the networked media content and/or demographic data. In this example, the transaction request is an image request which is received over a network 140 by the transaction server 120 of the networked privacy system 100 located in the target location 20.

In some cases, the current invention can look-up, identify or guess the source privacy zone associated with a transaction request from a client. For example, in some cases, information such as, but not limited to, an IP address, cookie or routing information inside a networking packet can be used, in part, to make this determination. In some embodiments of the current invention, the networked privacy system can discard transaction requests which originate from a source privacy zone based on one or more considerations such as, but not limited to, discarding a transaction request based on the identification of the source privacy zone or the privacy standards of the source privacy zone. In some cases, the networked privacy system can re-route the transaction request to another portion of the networked privacy system such as, for example, a portion of the networked privacy system located in a different target location which could have more attractive privacy standards based on the target location and/or storage location. In some cases, transaction requests could be re-directed for other reasons such as, but not limited to, load balancing considerations. For example, in some cases, the redirection may be accomplished by sending an HTTP command such as a temporary redirect (HTTP 302) to the client device instructing the client device to resubmit the transaction request to a portion of the networked privacy system which is located in a different target location.

In some examples of the current invention, privacy standards can be established based on the location of the client device. In some cases, the location of the client device can be guessed based on the networking protocol address associated with the client device as reported in the transaction request. The privacy standards can be used to govern the handling of data associated with the client device based on the source privacy zone; in some cases, the privacy standards can also be based on the target location (where the transaction request is received) and/or the storage location of the physical storage device. For example, a privacy standard may prevent the look-up of any characteristic values based on the networking protocol address of the client device. However, in some cases, the privacy standard may permit the current invention to record a limited amount of data in the filtered database such as: a networked media consumption activity occurred and a timestamp. In this way, it can be possible to provide limited service and/or collect limited data based on a client transaction request from a source privacy zone with restrictive privacy standards.

A variety of commercial services and commercial and/or private databases such as lookup service 170 can provide information based on a networking protocol address. For example, it is possible to use an IP address to obtain characteristic values for characteristics related to the client device and/or client device location such as, but not limited to: country, geographic region, city, state, province, area code, metro code, zip code, latitude, longitude, connection type, organization, domain name, ISP, netspeed/connection speed, proxy detection and/or mobile gateway detection. In addition, a network identifier such as an IP address can be used to obtain derived data such as language, currency, legal restrictions/regulations/tax laws, licensing/IP and copyright agreements, time zone and/or demographic identifiers such as DMA® codes (Nielsen Designated Market Areas). Depending on the database and/or service used, the information obtained from a networking protocol address can represent precise, verifiable information. However, it is understood that in some cases, the characteristic values obtained from a networking protocol address can represent an estimate, range, approximation, calculation, a probability or combinations thereof. The linkage of the networking protocol address or characteristics and characteristic values derived from the networking protocol address to the media consumption activity can be sensitive. According to the current invention, sensitive linkages can be established and protected according to the source privacy zone where the client device is located based on the privacy standard for the source privacy zone. In this way, the privacy standards governing the usage, and/or storage of the sensitive data can be applied and managed.

In this example, the data extractor 158 accesses the networking protocol address from the transaction server 120 and uses the networking protocol address to access one or more characteristics having one or more characteristic values. In some cases, the data extractor 158 can use one or more local systems such as lookup tables 172 and/or remote systems and/or databases such as optional lookup service 170 to access the characteristics and related characteristic values. In the example illustrated in FIG. 1, lookup tables 172 are internal to the data extractor 158 and kept in fast access memory. However, it is envisioned that in various embodiments of the current invention, lookup tables can be stored external to the data extractor 158; for example, in some cases, the lookup tables can be co-located with the filtered database. In some embodiments of the current invention, the operation of the data extractor can be subject to privacy standards. Note that in some cases, privacy standards can prevent the current invention from providing the networking protocol address to a remote system and/or database. However, in other cases, privacy standards may only prevent the current invention from providing the networking protocol address to a remote system and/or database when the networking protocol address is coupled to other sensitive data, making a simple look-up acceptable. In some cases, privacy standards may permit the use of a partial networking protocol address, such as the first few bits of an IP address, but restrict the use of the complete IP address.

The pre-processor 174 is provided with access to the dataset including characteristics and related characteristic values accessed by the data extractor 158 in conjunction with the networked media consumption activity. The pre-processor 174 processes datasets to comply with all the frequency criteria described in the privacy standards before the dataset can be inserted into the filtered database 160. In some cases, the dataset can be provided to an optional staging database 176, with the staging database 176 accessible by the pre-processor 174. In the example illustrated in FIG. 1, the staging database is stored in the pre-processor. For example, the staging database could be stored fast access memory. However, in other example of the current invention, it is envisioned that the staging database could be external to the pre-processor. For example, in some cases, the staging database could be co-located with the filtered database. In some cases, other information related to the networked media consumption activity such as characteristic times can also be provided to the pre-processor 174 and linked to the characteristics and related characteristic values. In some cases, information related to the networked privacy system can be provided to the pre-processor and optionally incorporated into the dataset such as, but not limited to, the receipt time of a transaction request at the networked privacy system.

The pre-processor 174 applies the privacy standards to the datasets before allowing them to be written to the filtered database 160. In some examples of the current invention, datasets which do not comply with at least one privacy standard can be discarded or altered to comply. In some cases, one or more characteristic values can be deleted or replaced in order to comply with the privacy standards. For example, one or more values or value ranges can be replaced with broader value ranges, noise can be introduced to one or more characteristic values, and/or one or more characteristic values can be subject to statistical obfuscation. For example, in some cases, statistical obfuscation can mean introducing noise to the dataset so that individual values are changed in a way that is meaningful over a large sample set. However, the change is not reversible, preventing the extraction of the original individual values from the statistically obfuscated fields.

In some examples, the pre-processor 174 can use a device such as, but not limited to, a tally or database query to determine the frequency of one or more characteristic values in order to apply frequency criteria. In some examples, the pre-processor can include models such as, but not limited to, probabilistic and/or statistical models, to estimate the frequency of one or more characteristics and then apply the frequency criteria to the estimates. Examples of data structures used in models for estimating frequency include, but are not limited to, Bloom filters, Aggregated Bloom Filters (ABFs), and Count-Min (CM) sketches. For example, a pre-processor can use Bloom filters or related data structures to estimate the frequency of some characteristic values. The pre-processor can use these estimates to determine compliance with the frequency criteria. In some cases, the models may be based on previously collected data. In some cases, the models may be pre-configured based on previously collected data. For example, a Bloom filter can be pre-loaded with previously collected data so that it has already "learned" the frequency associated with various characteristic values.

In some examples, the pre-processor 174 can use aggregated data to assess compliance with the frequency criteria. For example, it is envisioned that in some cases, the networked privacy system can be distributed across multiple servers, systems, data centers, and/or locations. In order to support high traffic applications, reliability, applications with client devices located in widespread geographic locations and/or compliance with privacy laws, some examples of networked privacy systems can include multiple instances and/or distributed implementations of transaction servers, data extractors, pre-processors, optional staging databases and filtered databases, all subject to the privacy standards. It is envisioned that aggregation can be handled in a variety of ways such as, but not limited to, using a centrally managed aggregator, enabling peer-to-peer aggregation and/or combinations thereof. For example, in some embodiments of the current invention, multiple pre-processors can be pre-processing datasets using a model incorporating a Count-Min sketch data structure, in parallel. To assess the frequency of a characteristic value, the pre-processor could attempt to find the frequency based on an aggregate of the Count-Min data structures managed by accessible pre-processors.

Note that some types of aggregation could be subject to privacy standards. For example, transferring collected data including information associated with networked media consumption activity from one location to another could invoke privacy standards with restrictions based on the storage location and/or privacy standards including restrictions on permissible data operations with respect to collected information associated with networked media consumption activity. However, aggregating data associated with data structures which cannot be queried to provide personally identifiable information would be unlikely to invoke privacy standards; for example some data structures such as, but not limited to, some types of Bloom filters, can be used to provide frequency estimates for characteristic values, but cannot be queried to provide personally identifiable information.

In some examples, the pre-processor 174 can temporarily store datasets in the optional staging database 176. For example, the pre-processor can leave datasets which do not yet comply with frequency criteria in the optional staging database 176. For example, a frequency criterion could forbid the storage of datasets with a characteristic "domain name" unless there are more than 500 datasets with the same characteristic value per day. The pre-processor 174 can permit the first 500 datasets with the characteristic value of "big_company.com" for the characteristic "domain name" to temporarily reside in the optional staging database 176. Sometime after the 501' dataset with the characteristic value of "big_company.com" for the characteristic "domain name" arrives within a time window of one day, the compliant datasets could be released by the pre-processor 174 for subsequent storage in the filtered database 160.

Before storage in the filtered database 160, datasets are stripped of the networking protocol address, which is discarded. In some embodiments of the current invention, this step can be executed in the pre-processor 174. In some examples, the networking protocol address can be discarded by other portions of the networked privacy system such as the data extractor 158, which could discard the networking protocol address after using it in the access of a characteristic value.

The physical storage device 162 is physically located in a storage location 163. For the example illustrated in FIG. 1, the storage location 163 and the target location 20 are co-located. However, it is envisioned that in some embodiments of the current invention, storage location and the target location may not be wholly co-located; it is also envisioned that storage location can be completely remote from the target location. The filtered database 160 is stored on physical storage devices 162 such as magnetic disk drives, optical drives, flash drives or combinations thereof incorporated into and/or coupled to the networked privacy server 100. Data including characteristics, with the related characteristic values, can be stored on physical storage 162, and managed, maintained and/or accessed using the filtered database 160, subject to privacy standards.

To protect privacy, the threshold conditions in the frequency criteria can be established based on a variety of parameters such as, but not limited to, the characteristics of the end-user using the client device, characteristics of the client device and/or characteristics associated with the networked media consumption activity. A privacy standard can restrict storing a dataset including elements with the business name of the client device's domain (with the business name extracted from networking protocol addresses) in conjunction with a purchase history or browsing history unless the dataset includes a minimum number of elements per business. For example, a complex or parameterized threshold condition could be set up to provide different thresholds for the minimum number of media consumption events associated with the characteristic "domain name" for businesses based on the estimated number of employees at the business.

A privacy standard can include frequency criteria related to two or more characteristic taken together. For example, a frequency criterion may restrict storage of datasets unless there at least 500 datasets with the combination of the same domain name and the same zip code for a time window. For example, with a fixed window, that could mean that unless at least 500 clients using the same Internet Service Provider (ISP) in the same zip code are monitored within a one day time window by the pre-processor, none of them could be entered into the filtered database. In some examples, the time window can be a moving window, with the oldest non-compliant datasets aging off as time elapses. In some examples, the time window can be a fixed time window, with data associated with expired time windows purged from the system.

In another example, a privacy standard can restrict the storage of datasets in conjunction with complex frequency criteria. For example, complex thresholds could be set up to require minimum counts for one or more characteristic values based on multiple time windows. For example, frequency criteria may require thresholds for 5 minutes, 1 hour, 2 hours, 1 day and 1 week time windows.

According to the current invention, frequency criteria associated with privacy standards can be set to an absolute value, range of values, set of values or a profile. In some cases, the frequency criteria may vary according to time, day and/or date windows or be parameterized. For example, frequency criteria can be set differently for datasets associated with a client device located at a large company compared to datasets associated with a client device located at a small company, based on the domain name associated with the client device. In some examples, a characteristic value such as a "domain name" could be evaluated based on sets of commonly owned domain names. In some examples, frequency criteria could be set to one set of values at a known high traffic time window and to another set of values at a known low traffic time window. In some cases, frequency criteria can be automatically set based on past data collection. For example, if a full week of data collection shows that the number of clients in a source privacy zone purchasing shoes at a shoe selling website was so large that re-identification based on the source privacy zone and the collected data and characteristics in the database would not be possible or likely, a privacy standard can be established with respect to that source privacy zone that only prevents the exact time of the shoe purchase transaction from being stored in the filtered database.

In some examples, a privacy standard can optionally include restrictions on permissible data operations with respect to information associated with networked media consumption activity collected from the source privacy zone. For example, in some cases, some or all characteristic value look-ups based on IP addresses (such as looking up a mailing address based on an IP address) can be forbidden by local law in a particular geographic region. According to some embodiments of the current invention, a source privacy zone can be established to correspond to that geographic region and a privacy standard can be established forbidding the lookup of a mailing address based on an IP address based on transaction requests originating from clients in that source privacy zone. For example, in some embodiments of the current invention, this element of the privacy standard can be enforced in the data extractor 158 and/or the transaction server 120. Note that some privacy systems support aggregation of data for a variety of reasons such as, but not limited to: configuring models, pre-configuring models, database management and/or assessing the frequency of one or more characteristic values; for these privacy systems, the aggregation operations can be subject to privacy standards such as privacy standards restricting permissible data operations and/or privacy standards including restrictions based on the target location and/or the storage location.

In the example illustrated in FIG. 1, the networked privacy system 100 is a third party system with respect to the networked media content servers 156 and 158, and the transaction requests can be related to media consumption activities associated with multiple networked content servers. In some embodiments of the current invention, the networked privacy system can be dedicated to media consumption activities associated with a single networked media content entity such as an IPTV network or a large internet portal. The networked privacy system can be a third party system with respect to the single networked entity in this case, operated and/or maintained independently from the single networked entity. However, the networked privacy system can also be implemented as an in-house tool resident on the same systems as the single networked entity.

Some examples of filtered databases may be designated "exportable", meaning that the filtered database is permitted to release data; in some cases, additional policies may be used to regulate the release of data such as policies related to security considerations. Some examples of filtered databases may be designated "partially exportable", meaning that the filtered database can be permitted to release some data to a destination, possibly subject to privacy standards and/or export rules which can be based on the geographic location of the destination. It is envisioned that a variety of other designations are possible. An optional security program can be used in conjunction with the current invention to manage exporting data from the filtered database.

Figure 2:
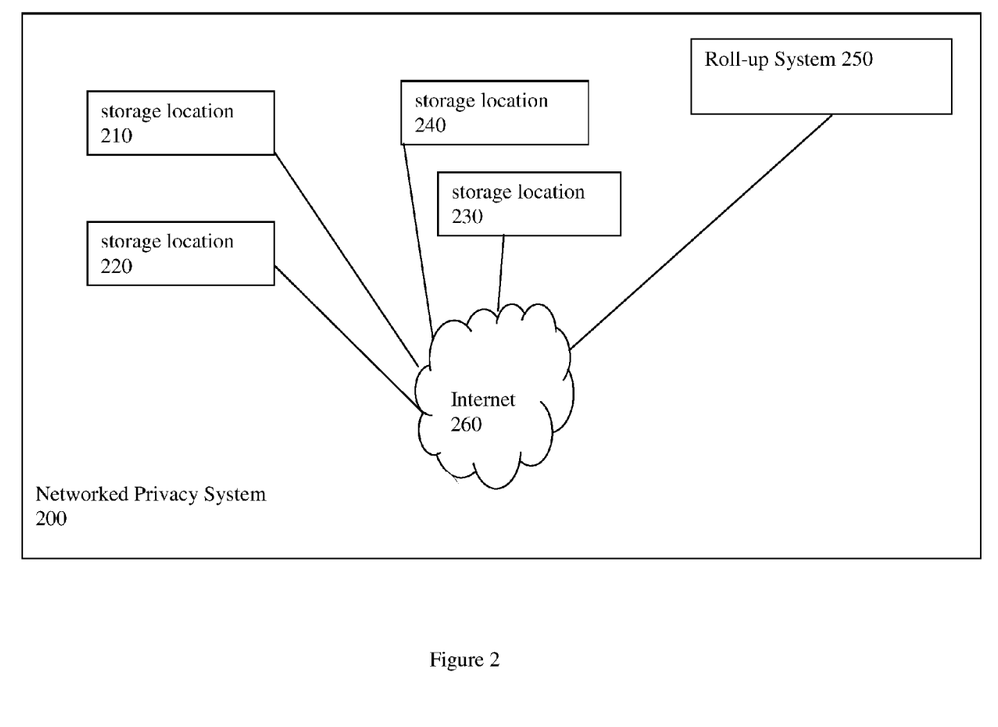
FIG. 2 illustrates a networked privacy system including multiple storage locations; and, FIG. 3 illustrates a method flow according to an example of the current invention.

FIG. 2 illustrates a networked privacy system 200 including multiple storage locations 210, 220, 230 and 240. In this example, each storage location can be coupled to at least one pre-processor. In some examples, two or more storage locations can be coupled to the same pre-processor; in some examples a single storage location can be coupled to multiple pre-processors. In this example, the filtered databases are designated "exportable". A roll up system 250 can be used to view and or collect datasets which roll up from multiple storage locations, without compromising the privacy standards specific to each storage location. In some cases, a roll up system such as system 250 can also be used to support aggregation.

Figure 3:
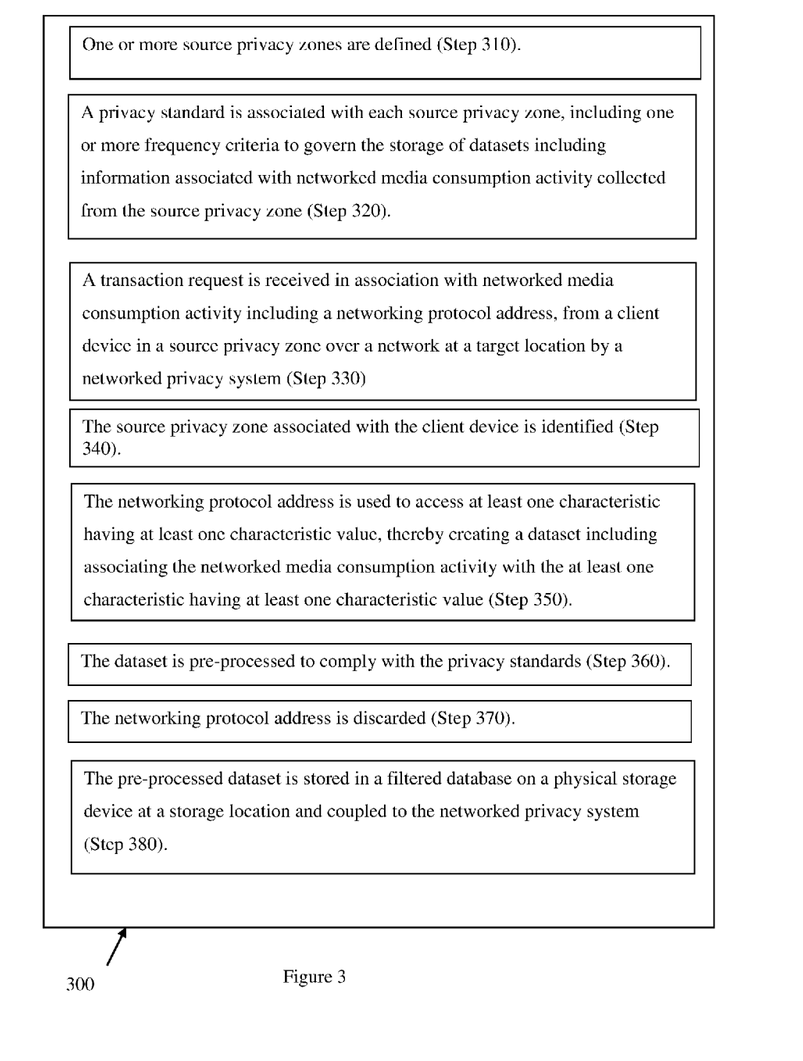

FIG. 3 illustrates a method flow according to an example of the current invention. An example method 300 begins when one or more source privacy zones are defined (Step 310); the method continues when a privacy standard is associated with each source privacy zone, including one or more frequency criteria to govern the storage of datasets including information associated with networked media consumption activity collected from the source privacy zone (Step 320); the method continues when a transaction request is received in association with networked media consumption activity including a networking protocol address, from a client device in a source privacy zone over a network at a target location by a networked privacy system (Step 330); the method continues when the source privacy zone associated with the client device is identified (Step 340); the method continues when the networking protocol address is used to access at least one characteristic having at least one characteristic value, thereby creating a dataset including associating the networked media consumption activity with the at least one characteristic having at least one characteristic value (Step 350); the method continues when the dataset is pre-processed to comply with the privacy standards (Step 360); the method continues when the networking protocol address is discarded (Step 370); and, the method continues when the pre-processed dataset is stored in a filtered database on a physical storage device at a storage location and coupled to the networked privacy system (Step 380).

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for preserving privacy related to networked media consumption activity, the method comprising:
   defining multiple privacy zones;
   associating a privacy standard with each respective privacy zone;
   receiving a request sent from a client device to a networked privacy system requesting content from the networked privacy system, the request related to a networked media consumption activity of the client device; and
   responsive to receiving the request;
      selecting a privacy zone from the multiple privacy zones for the client device according to a location of the client device;
      accessing a characteristic of the client device's location;
      estimating a frequency of the accessed characteristic in the selected privacy zone from a data structure selected from the group consisting of a Bloom Filter data structure and a Count-Min Sketch data structure; and
      responsive to the estimated frequency complying with a frequency criterion of the selected privacy zone's privacy standard, adding the accessed characteristic to a dataset.

2. The method of claim 1 further comprising:
   responsive to the estimated frequency not complying with a frequency criterion of the selected privacy zone's privacy standard, preventing the accessed characteristic from being added to the dataset.

3. The method of claim 1 wherein:
   the request comprises the characteristic.

4. The method of claim 1 wherein:
accessing comprises retrieving a characteristic by providing information received in the transaction request.

5. The method of claim 1 wherein:
the privacy standard comprises restrictions associated with a location of the networked privacy system.

6. The method of claim 1 wherein:
the privacy standard comprises restrictions associated with a location of the dataset.

7. The method of claim 1 wherein:
the networked privacy system is a third party system with respect to the client device.

8. The method of claim 1 further comprising:
storing the dataset in a storage at the networked privacy system.

9. A non-transitory computer readable storage medium executing computer program instructions, the computer program instructions comprising instructions for:
defining multiple privacy zones;
associating a privacy standard with each respective privacy zone;
receiving a request sent from a client device to a networked privacy system requesting content from the networked privacy system, the request related to a networked media consumption activity of the client device; and
responsive to receiving the request;
selecting a privacy zone from the multiple privacy zones for the client device according to a location of the client device;
accessing a characteristic of the client device's location;
estimating a frequency of the accessed characteristic in the selected privacy zone from a data structure selected from the group consisting of a Bloom Filter data structure and a Count-Min Sketch data structure; and
responsive to the estimated frequency complying with a frequency criterion of the selected privacy zone's privacy standard, adding the accessed characteristic to a dataset.

10. The computer-readable storage medium of claim 9, wherein the instructions further comprise:
storing the dataset in a storage at the networked privacy system.

11. The computer-readable storage medium of claim 9, wherein:
accessing comprises retrieving a characteristic by providing information received in the transaction request.

12. The computer-readable storage medium of claim 9, wherein the instructions further comprise:
responsive to the estimated frequency not complying with a frequency criterion of the selected privacy zone's privacy standard, preventing the accessed characteristic from being added to a dataset.

13. A system, comprising:
a processor; and
a computer readable non-transitory storage medium storing processor-executable computer program instructions, the instructions comprising instructions for:
defining multiple privacy zones;
associating a privacy standard with each respective privacy zone;
receiving a request sent from a client device to the system requesting content from the system, the request related to a networked media consumption activity of the client device; and
responsive to receiving the request,
selecting a privacy zone from the multiple privacy zones for the client device according to a location of the client device;
accessing a characteristic of the client device's location;
estimating a frequency of the accessed characteristic in the selected privacy zone from a data structure selected from the group consisting of a Bloom Filter data structure and a Count-Min Sketch data structure; and
responsive to the estimated frequency complying with a frequency criterion of the selected privacy zone's privacy standard, adding the accessed characteristic to a dataset.

14. The system of claim 13, wherein the instructions further comprise:
storing the dataset in a storage at the networked privacy system.

15. The system of claim 13, wherein:
accessing comprises retrieving a characteristic by providing information received in the transaction request.

\* \* \* \* \*